US012617961B2

(12) United States Patent
Shiozaki et al.

(10) Patent No.: US 12,617,961 B2
(45) Date of Patent: May 5, 2026

(54) UV-CURABLE AQUEOUS INKJET PRINTING INK COMPOSITION

(71) Applicant: SAKATA INX CORPORATION, Osaka (JP)

(72) Inventors: Daigo Shiozaki, Osaka (JP); Jun Kinjoh, Osaka (JP); Okinori Nakashima, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 192 days.

(21) Appl. No.: 18/547,329

(22) PCT Filed: Nov. 24, 2021

(86) PCT No.: PCT/JP2021/042931

§ 371 (c)(1),
(2) Date: Aug. 21, 2023

(87) PCT Pub. No.: WO2022/180962

PCT Pub. Date: Sep. 1, 2022

(65) Prior Publication Data

US 2024/0132737 A1     Apr. 25, 2024
US 2024/0228807 A9     Jul. 11, 2024

(30) Foreign Application Priority Data

Feb. 26, 2021     (JP) ................................. 2021-030998

(51) Int. Cl.
C09D 11/322      (2014.01)
B41J 11/00       (2006.01)
C09D 11/38       (2014.01)

(52) U.S. Cl.
CPC ....... C09D 11/322 (2013.01); B41J 11/00214 (2021.01); C09D 11/38 (2013.01)

(58) Field of Classification Search
CPC ..... C09D 11/30; C09D 11/101; C09D 11/322; C09D 11/326; C08L 75/04; C03C 25/106; C08G 18/40; C09B 23/0008
See application file for complete search history.

(56) References Cited

U.S. PATENT DOCUMENTS

| | | | | |
|---|---|---|---|---|
| 6,136,890 | A * | 10/2000 | Carlson | C08G 18/0804 528/69 |
| 6,359,025 | B1 * | 3/2002 | Snowwhite | C03C 25/106 522/182 |
| 9,239,408 | B2 * | 1/2016 | Maeda | C09B 23/0008 |
| 2006/0148924 | A1 * | 7/2006 | Lachowicz | C08F 299/024 526/341 |
| 2008/0076846 | A1 * | 3/2008 | Kito | C09D 11/101 522/152 |
| 2008/0289534 | A1 * | 11/2008 | Deroover | C09B 67/0055 534/865 |
| 2012/0249700 | A1 | 10/2012 | Amao et al. | |
| 2012/0270018 | A1 * | 10/2012 | Mizutani | C09D 11/322 522/167 |
| 2014/0011941 | A1 * | 1/2014 | Anton | C09D 11/324 524/505 |
| 2014/0333704 | A1 * | 11/2014 | Takabayashi | B41J 2/2107 347/102 |
| 2015/0247044 | A1 | 9/2015 | Brandstein et al. | |
| 2018/0264716 | A1 | 9/2018 | Kiyosada | |
| 2020/0010662 | A1 | 1/2020 | Hiraoka et al. | |
| 2020/0032084 | A1 | 1/2020 | Fujii | |
| 2020/0039274 | A1 | 2/2020 | Ozaki | |
| 2023/0391937 | A1 * | 12/2023 | Yasunaga | A61Q 5/06 |

FOREIGN PATENT DOCUMENTS

| | | | |
|---|---|---|---|
| CN | 109575688 A | 4/2019 | |
| EP | 4484499 A1 * | 1/2025 | .......... H05K 1/0373 |
| JP | 2006028377 A | 2/2006 | |

(Continued)

OTHER PUBLICATIONS

International Preliminary Report on Patentability, dated Aug. 29, 2023, for corresponding international application PCT/JP2021/042931 (1 page).
Notification Concerning Transmittal of International Preliminary Report on Patentability, mailed Sep. 7, 2023, for corresponding international application PCT/JP2021/042931 (1 page).
Notification of Transmittal of Translation of the International Preliminary Report on Patentability, mailed Sep. 7, 2023, for corresponding international application PCT/JP2021/042931 (1 page).
Written Opinion of the International Searching Authority, mailed Feb. 15, 2022, for corresponding international application PCT/JP2021/042931 (4 pages).
Extended European Search Report (EESR) dated May 12, 2025, issued for European counterpart patent application No. EP21928056.7 (7 pages).

(Continued)

*Primary Examiner* — John P Zimmermann
(74) *Attorney, Agent, or Firm* — Law Office of Katsuhiro Arai

(57)     ABSTRACT

A UV-curable aqueous inkjet printing ink composition contains: water-soluble acrylamide-based monomers by 20.0 to 70.0% by mass, water-soluble hydroxyl group-containing monofunctional monomers by 5.0 to 60.0% by mass, and water-insoluble polymerizable compounds by 8.0 to 35.0% by mass, relative to the total mass of all polymerizable components; a photopolymerizable initiator and/or sensitizer by 3.0 to 10.0 parts by mass relative to 100 parts by mass representing the total mass of all polymerizable components; a pigment; and water; wherein the ratio of the water-soluble acrylamide-based monomers and water-soluble hydroxyl group-containing monofunctional monomers, (water-soluble acrylamide-based monomers/water-soluble hydroxyl group-containing monofunctional monomers), is 0.3 to 10.0; and the ink composition has ability to be partially cured by being irradiated with a UV-LED light having a peak wavelength between 365 and 405 nm, to a cumulative light quantity of 100 mJ/cm$^2$ or less.

10 Claims, No Drawings

(56)      References Cited

FOREIGN PATENT DOCUMENTS

| | | | |
|---|---|---|---|
| JP | 2012111822 | A | 6/2012 |
| JP | 2015533873 | A | 11/2015 |
| JP | 2017122211 | A | 7/2017 |
| JP | 2019001865 | A | 1/2019 |
| JP | 2019019249 | A | 2/2019 |
| JP | 2019065257 | A | 4/2019 |
| JP | 2020015790 | A | 1/2020 |
| JP | 2020023154 | A | 2/2020 |
| WO | 2016125816 | A1 | 8/2016 |

OTHER PUBLICATIONS

International Search Report (ISR) mailed Feb. 15, 2022, issued for International application No. PCT/JP2021/042931. (3 pages).

* cited by examiner

UV-CURABLE AQUEOUS INKJET PRINTING INK COMPOSITION

CROSS-REFERENCE TO RELATED APPLICATIONS

This application is the U.S. National Phase under 35 U.S.C. § 371 of International Application PCT/JP2021/042931, filed Nov. 24, 2021, which claims priority to Japanese Patent Application No. JP2021-030998, filed Feb. 26, 2021. The International Application was published under PCT Article 21(2) in a language other than English.

TECHNICAL FIELD

The present invention relates to a UV-curable aqueous inkjet printing ink composition and a method for printing.

BACKGROUND ART

Patent Literature 1 describes a UV-curable aqueous inkjet printing ink composition containing water-soluble resin or emulsion resin and UV-curable compound, as well as an art of applying primary drying and secondary drying by means of heating post-printing, followed by irradiation of ultraviolet ray, to obtain a final printed matter, while Patent Literature 2 describes a UV-curable water-based inkjet recording ink containing monomer components selected from n-butyl acrylate, t-butylacrylamide, 2-hydroxyethyl acrylate, etc., as well as an art of curing the ink with a single irradiation of ultraviolet ray.

BACKGROUND ART LITERATURE

Patent Literature

Patent Literature 1: Japanese Patent Laid-open No. 2012-111822

Patent Literature 2: Japanese Patent Laid-open No. 2006-028377

SUMMARY OF THE INVENTION

Problems to be Solved by the Invention

According to the invention described in each of the aforementioned patent literatures, what is proposed can be printed as an inkjet printing ink composition; however, no consideration is given to improving its compatibility and storage stability as a UV-curable aqueous inkjet printing ink composition or to eliminating the grainy feel of printed areas.

An object of the present invention is to obtain a UV-curable aqueous inkjet printing ink composition, as well as a method for printing using the same, offering excellent compatibility and storage stability, and also capable of forming printed areas free of grainy feel while demonstrating excellent curability and water resistance, by conducting partial curing after printing, followed by full curing.

Means for Solving the Problems

As a result of studying in earnest to achieve the aforementioned object, the inventors of the present invention found that the aforementioned object could be achieved by a specific composition and a specific method for printing, and eventually completed the present invention.

1. A UV-curable aqueous inkjet printing ink composition, comprising, relative to a total mass of all polymerizable components, each of:
   water-soluble acrylamide-based monomers by 20.0 to 70.0% by mass,
   water-soluble hydroxyl group-containing monofunctional monomers by 5.0 to 60.0% by mass, and
   water-insoluble polymerizable compound(s) by 8.0 to 35.0% by mass;
further comprising, relative to 100 parts by mass representing a total mass of all polymerizable components, a photopolymerizable initiator and/or sensitizer by 3.0 to 10.0 parts by mass;
further containing:
a pigment; and
water;
wherein a ratio of the water-soluble acrylamide-based monomers and the water-soluble hydroxyl group-containing monofunctional monomers (acrylamide-based monomers/hydroxyl group-containing monofunctional monomers) is from 0.3 to 10.0; and
the ink composition is for printing that includes a step in which it is partially cured by irradiating it with a UV-LED light having a peak wavelength between 365 and 405 nm, at a cumulative light quantity of 100 mJ/cm$^2$ or less.

2. The UV-curable aqueous inkjet printing ink composition according to 1, wherein the water-soluble acrylamide-based monomers include acryloyl morpholine.

3. The UV-curable aqueous inkjet printing ink composition according to 1 or 2, wherein the water-soluble hydroxyl group-containing monofunctional monomers include 4-hydroxybutyl acrylate.

4. The UV-curable aqueous inkjet printing ink composition according to any one of 1 to 3, wherein the content of the water is 10.0 to 40.0% by mass relative to the ink composition as a whole.

5. The UV-curable aqueous inkjet printing ink composition according to any one of 1 to 4, wherein it contains a pigment dispersant having a maleimide structure and/or pigment dispersant having a pyridine ring.

6. A method for printing using a UV-curable aqueous inkjet printing ink composition,
   which comprises, relative to a total mass of all polymerizable components, each of:
   water-soluble acrylamide-based monomers by 20.0 to 70.0% by mass,
   water-soluble hydroxyl group-containing monofunctional monomers by 5.0 to 60.0% by mass, and
   water-insoluble polymerizable compound(s) by 8.0 to 35.0% by mass;
which further comprises, relative to 100 parts by mass representing a total mass of all polymerizable components, a photopolymerizable initiator and/or sensitizer by 3.0 to 10.0 parts by mass;
further containing:
a pigment; and
water;
wherein a ratio of the water-soluble acrylamide-based monomers and the water-soluble hydroxyl group-containing monofunctional monomers (acrylamide-based monomers/hydroxyl group-containing monofunctional monomers) is from 0.3 to 10.0;
a step is conducted, in which it is partially cured by irradiating it using a UV-LED lamp having a peak wavelength between 365 and 405 nm, at a cumulative light quantity of 100 mJ/cm$^2$ or less; and a step is included to subsequently fully cure it with ultraviolet ray.

7. The method for printing using a UV-curable aqueous inkjet printing ink composition according to 6, wherein the ink composition contains acryloyl morpholine as the water-soluble acrylamide-based monomers.

8. The method for printing using a UV-curable aqueous inkjet printing ink composition according to 6 or 7, wherein the water-soluble hydroxyl group-containing monofunctional monomers include 4-hydroxybutyl acrylate.

9. The method for printing using a UV-curable aqueous inkjet printing ink composition according to any one of 6 to 8, wherein the content of the water is 10.0 to 40.0% by mass relative to the ink composition as a whole.

10. The method for printing using a UV-curable aqueous inkjet printing ink composition according to any one of 6 to 9, wherein the ink composition contains a pigment dispersant having a maleimide structure and/or pigment dispersant having a pyridine ring.

Effects of the Invention

The UV-curable aqueous inkjet printing ink composition proposed by the present invention offers excellent compatibility and storage stability.

Furthermore, it has an effect of allowing printed areas to form that are free of grainy feel while demonstrating excellent curability and water resistance when print areas that have been printed with the ink composition are irradiated with ultraviolet ray to be partially cured, and then irradiated again with ultraviolet ray to be fully cured.

MODE FOR CARRYING OUT THE INVENTION

The UV-curable aqueous inkjet printing ink composition and method for printing the same, as proposed by the present invention, are explained below.

It should be noted that each water-soluble compound under the present invention refers to a compound that, if liquid at room temperature, will not separate from water but remain dissolved in it when the compound is mixed with water at a ratio by mass of 1:9 and kept stationary for a sufficient period of time.

It refers to a compound that, if solid at room temperature, will not separate from water but remain dissolved in it when the compound is mixed with water at a ratio by mass of 1:9 under heating conditions that achieve a sufficient temperature, and then kept stationary at room temperature for a sufficient period of time.

Any compound that does not exhibit such behaviors is classified as non-water-soluble, instead of being a water-soluble compound under the present invention.
(Water-Soluble Acrylamides)

The water-soluble acrylamides used under the present invention include (meth)acrylamide, acryloyl morpholine, N-methoxymethylarylamide, diacetone acrylamide, N,N-dimethylacrylamide, diethylacrylamide, and other acrylamides.

Besides these, hydroxymethyl(meth)acryldiamide, di(2-hydroxyethyl)(meth)acrylamide, di(3-hydroxypropyl)(meth)acrylamide, di(4-hydroxybutyl)(meth)acrylamide, and other N-alkylol (C1-5) (meth)acrylamides, as well as ethylene oxide or propylene oxide 1-3 mol adducts of these N-alkylol (C1-5) (meth)acrylamides, can also be used.

The water-soluble acrylamides are contained by 20.0 to 70.0% by mass among all polymerizable components in the UV-curable inkjet printing ink composition proposed by the present invention. They are contained by preferably 25.0% by mass or more, or more preferably 30.0% by mass or more, or yet more preferably 35.0% by mass or more, or most preferably 40.0% by mass or more.

Also, the water-soluble acrylamides are contained by preferably 65.0% by mass or less, or more preferably 60.0% by mass or less, or yet more preferably 55.0% by mass or less, or most preferably 50.0% by mass or less, among all polymerizable components.
(Water-Soluble Hydroxyl Group-Containing Monofunctional Monomers)

For the water-soluble hydroxyl group-containing monofunctional monomers used under the present invention, 2-hydroxyethyl (meth)acrylate, 2-hydroxypropyl (meth)acrylate, 3-hydroxypropyl (meth)acrylate, 3-hydroxybutyl (meth)acrylate, 4-hydroxybutyl (meth)acrylate, and other hydroxyalkyl (meth)acrylates can be adopted.

It should be noted that those water-soluble hydroxyl group-containing monofunctional monomers that are also classified as the aforementioned acrylamide compounds, are considered a part of the content of the aforementioned water-soluble acrylamides, not water-soluble hydroxyl group-containing monofunctional monomers, when calculating the contents in the composition proposed by the present invention.

The water-soluble hydroxyl group-containing monofunctional monomers are contained by 5.0 to 60.0% by mass among all polymerizable components in the UV-curable aqueous inkjet printing ink composition proposed by the present invention. They are contained by preferably 10.0% by mass or more, or more preferably 15.0% by mass or more, or yet more preferably 20.0% by mass or more, or most preferably 25.0% by mass or more.

Also, the water-soluble hydroxyl group-containing monofunctional monomers are contained by preferably 55.0% by mass or less, or more preferably 50.0% by mass or less, or yet more preferably 45.0% by mass or less, or most preferably 40.0% by mass or less, among all polymerizable components.
(Other Water-Soluble Monofunctional Monomers)

Other water-soluble monofunctional monomers that may be contained under the present invention include (meth)acrylic acid, (ethylene glycol) methyl ether acrylate, (ethylene glycol) methyl ether methacrylate, vinyl pyrrolidone, vinyl 4-methylpyrrolidone, vinyl 4-phenylpyrrolidone, vinyl imidazole, vinyl 4-methylimidazole, vinyl 4-phenylimidazole, etc.
(Water-Insoluble Polymerizable Compounds)

The water-insoluble polymerizable compounds used under the present invention include monofunctional monomers, polyfunctional monomers, oligomers, etc., of which one or more types are contained.

The water-insoluble polymerizable compounds are contained by 8.0 to 35.0% by mass among all polymerizable components in the UV-curable aqueous inkjet printing ink composition proposed by the present invention.

The water-insoluble polymerizable compounds are contained by preferably 10.0% by mass or more, or more preferably 13.0% by mass or more, or yet more preferably 15.0% by mass or more, or most preferably 17.0% by mass or more, among all polymerizable components.

Also, the water-insoluble polymerizable compounds are contained by preferably 30.0% by mass or less, or more preferably 27.0% by mass or less, or yet more preferably 25.0% by mass or less, or most preferably 23.0% by mass or less, among all polymerizable components.

The monofunctional monomers include ethyl (meth)acrylate, methyl (meth)acrylate, propyl (meth)acrylate, butyl (meth)acrylate, 2-ethylhexyl (meth)acrylate, lauryl (meth) acrylate, isobornyl (meth)acrylate, and other alkyl (meth) acrylates, benzyl (meth)acrylate, phenoxyethyl (meth)acrylate, ethoxylated phenyl (meth)acrylate, and other aromatic (meth)acrylates, etc.

The polyfunctional monomers include dipropylene glycol diacrylate, 1,6-hexanediol diacrylate, tripropylene glycol diacrylate, PO-modified neopentyl glycol diacrylate, modified bisphenol A diacrylate, tricyclodecane dimethanol diacrylate, trimethylolpropane tri(meth)acrylate, EO-modified trimethylolpropane tri(meth)acrylate, PO-modified trimethylolpropane tri(meth)acrylate, EO-modified glycerin tri (meth)acrylate, PO-modified glycerin tri(meth)acrylate, pentaerythritol triacrylate, pentaerythritol tetraacrylate, dipentaerythritol pentaacrylate, dipentaerythritol hexaacrylate, ditrimethylolpropane tetraacrylate, etc.

The oligomers include one or more types selected from amine-modified (meth)acrylate oligomers and epoxy (meth) acrylate oligomers, where these polymerizable oligomers are contained by preferably 5.0% by mass or more, or more preferably 10.0% by mass or more, relative to all polymerizable components of the ink. Also, they are contained by preferably 25.0% by mass or less, or more preferably 20.0% by mass or less.

The amine-modified (meth)acrylate oligomers are not specifically limited so long as they are oligomers having at least one amino group and at least one (meth)acryloyl group in the molecule. Meanwhile, although the number of (meth) acryloyl groups the amine-modified (meth)acrylate oligomers have in the molecule is not specifically limited so long as it is 1 or greater, preferably the number is 1 or greater but no greater than 6, or more preferably 2 or greater but no greater than 4. When the number of (meth)acryloyl groups is within the aforementioned ranges, it becomes easier for the amine-modified (meth)acrylate oligomers to react with the polymerizable compounds, and it becomes more likely that the viscosity of the ink composition falls within an appropriate range.

The amine-modified (meth)acrylate oligomers may be synthesized products obtained by polymerizing desired monomers, or they may be commercial products. Commercial products representing the amine-modified (meth)acrylate oligomers include, for example: those under the product names "GENOMER 5161", "GENOMER 5275" (Rahn AG); those under the product names "CN371", "CN373", "CN383", "CN384", "CN386", "CN501", "CN550", "CN551" (Sartomer Company, Inc.); those under the product names "EBECRYL 7100", "EBECRYL 80", "EBECRYL 81", "EBECRYL 83", "EBECRYL 84", "EBECRYL P115" (Daicel-Cytec Co., Ltd.); those under the product names "LAROMER PO 77 F" (LR 8946), "LAROMER LR 8956", "LAROMER LR 8996", "LAROMER PO 94 F" (LR 8894) (BASF SE); those under the product names "PHOTOMER 4771", "PHOTOMER 4775", "PHOTOMER 4967", "PHOTOMER 5096", "PHOTOMER 5662", "PHOTOMER 5930" (Cognis Holding GmbH); those under the product names "DOUBLECURE EPD", "DOUBLECURE OPD", "DOUBLECURE 115", "DOUBLECURE 225", "DOUBLECURE 645", "POLY Q 222", "POLY Q 226", "POLY Q 224", "POLY Q 101" (Double Bond Chemical Ind. Co., Ltd.).

The epoxy (meth)acrylate oligomers may be synthesized products obtained by polymerizing desired monomers, or they may be commercial products. Commercial products representing the epoxy (meth)acrylate oligomers include, for example: those under the product names "EBECRYL 3708", "EBECRYL 1606" (Daicel-Cytec Co., Ltd.); and those under the product names "CN116", "CN120B60", "CN120M50", "CN131B", "CN132", "CN137", "CN152", "CN153", "CN2102E", "CN2003" (Sartomer Company, Inc.).

(Photopolymerization Initiators)

The UV-curable aqueous inkjet printing ink composition proposed by the present invention contains a photopolymerization initiator. The photopolymerization initiator is not specifically limited so long as it initiates photopolymerization, and any photopolymerization initiator used in photocurable inkjet printing ink compositions can be used.

The photopolymerization initiator may be, for example, a benzoin ether-based photopolymerization initiator, acetophenone-based photopolymerization initiator, $\alpha$-ketol-based photopolymerization initiator, aromatic sulfonyl chloride-based photopolymerization initiator, photoactive oxime-based photopolymerization initiator, benzoin-based photopolymerization initiator, benzyl-based photopolymerization initiator, benzophenone-based photopolymerization initiator, ketal-based photopolymerization initiator, thioxanthone-based photopolymerization initiator, triazine-based photopolymerization initiator, acylphosphine oxide-based photopolymerization initiator, etc. Of these, a triazine-based photopolymerization initiator or acylphosphine oxide-based photopolymerization initiator is preferred from the viewpoint of good curability to light-emitting diode (LED) light. Any of the aforementioned photopolymerization initiators can be used alone, or two or more types can be combined.

The triazine-based photopolymerization initiator may be, for example, 2,4,6-trichloro-s-triazine, 2-phenyl-4,6-bis (trichloromethyl)-s-triazine, 2-(p-methoxyphenyl)-4,6-bis (trichloromethyl)-s-triazine, 2-(p-tolyl)-4,6-bis(trichloromethyl)-s-triazine, 2-pipenyl-4,6-bis(trichloromethyl)-s-triazine, 2,4-bis(trichloromethyl)-6-styryl-s-triazine, 2-(naphth-1-yl)-4,6-bis(trichloromethyl)-s-triazine, 2-(4-methoxy-naphth-1-yl)-4,6-bis(trichloromethyl)-s-triazine, 2,4-trichloromethyl-(piperonyl)-6-triazine, 2,4-trichloromethyl(4'-methoxystyryl)-6-triazine, etc., and, among commercial products, it may be, for example, one under the product name "TAZ-204" (Midori Kagaku Co., Ltd.), etc.

The acylphosphine oxide-based photopolymerization initiator may be, for example, 2,4,6-trimethylbenzoyl-diphenyl-phosphine oxide (product name "TPO", "Lamberti S.p.A."), (2,4,6-trimethylbenzoyl)-ethoxyphenylphosphine oxide (product name "TPO-L"), bis(2,4,6-trimethylbenzoyl)-phenylphosphine oxide (product name "OMNIRAD 819", "IGM Resins B.V."), etc.

(Sensitizers)

The UV-curable aqueous inkjet printing ink composition proposed by the present invention may contain a sensitizer from the viewpoint of improving its curability. For the sensitizer, any one sensitizer can be used alone, or two or more types can be combined.

The sensitizer may be, for example, 9,10-dibutoxyanthracene, 9,10-diethoxyanthracene, 9,10-dipropoxyanthracene, 9,10-bis(2-ethylhexyloxy)anthracene, or other anthracene-based sensitizer; or 2,4-diethylthioxanthone, 2-isopropylthioxanthone, 4-isopropylthioxanthone, or other thioxanthone-based sensitizer, and the like. Of these, a thioxanthone-based sensitizer is preferred. Commercial products representing the aforementioned sensitizers include those under the product names "DBA", "DEA" (Kawasaki Kasei Chemicals Ltd.) for anthracene-based sensitizers, and those under the product names "DETX", "ITX" (Lambson Ltd.) for thioxanthone-based sensitizers, for example.

Preferably the percentage of the sensitizer in the ink composition is 5% by mass or less from the viewpoint of preventing excessive addition. It should be noted that, if a thioxanthone-based sensitizer is used as the sensitizer, the UV-curable aqueous inkjet printing ink composition tends to turn yellow, and therefore preferably the content of thioxanthone-based sensitizer is determined as deemed appropriate for each hue. For example, preferably white ink compositions and clear ink compositions that are more easily affected by a change in color tone do not contain any thioxanthone-based sensitizer as the sensitizer. Also, preferably, magenta ink compositions and cyan ink compositions that present problems if a change in hue occurs use a thioxanthone-based sensitizer only to the extent that doing so does not cause problems with the hue. Also, preferably black ink compositions and yellow ink compositions use a thioxanthone-based sensitizer as the sensitizer because their hue is not affected by a color change and their photopolymerizability is lower compared to ink compositions of other hues.

Under the present invention, a photopolymerization initiator and/or sensitizer are/is contained by 3.0 to 10.0 parts by mass relative to 100 parts by mass representing the total mass of all polymerizable components in the ink composition. Here, if both a photopolymerization initiator and a sensitizer are contained, this ratio represents the ratio of their total amount; whereas, if only one is contained, the ratio represents the ratio of whichever is contained, alone.

(Pigments)

The UV-curable aqueous inkjet printing ink composition proposed by the present invention contains a pigment. Any pigment can be used alone, or two or more types can be combined.

For the pigment, any of organic pigments, inorganic pigments, and other pigments used in inkjet ink compositions can be used without specific limitations. The organic pigments include, for example, dye rake pigments as well as azo-based pigments, benzimidazolone-based pigments, phthalocyanine-based pigments, quinacridone-based pigments, anthraquinone-based pigments, dioxazine-based pigments, indigo-based pigments, thioindigo-based pigments, perylene-based pigments, perinone-based pigments, diketopyrrolopyrrole-based pigments, isoindolinone-based pigments, nitro-based pigments, nitroso-based pigments, flavanthrone-based pigments, quinophthalone-based pigments, pyranthrone-based pigments, indanthrone-based pigments, and the like. The inorganic pigments include, for example, carbon black, titanium oxide, zinc flower, red iron oxide, graphite, iron black, chrome oxide green, aluminum hydroxide, etc. The pigment may be one whose surface has been treated with any known surface treatment agent.

Specific examples of the pigments are listed below by each representative hue.

Yellow pigments include, for example, C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, etc.

Magenta pigments include, for example, C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, etc.

Cyan pigments include, for example, C. I. Pigment Blue 1, 2, 3, 15, 15:1, 15:2, 15:3, 15:4, 15:6, 16, 18, 22, 27, 29, 60, etc.

Black pigments include, for example, carbon black (C. I. Pigment Black 7), etc.

White pigments include, for example, titanium oxide, aluminum oxide, etc., whose surface may have been treated with alumina, silica, or various other materials.

In the ink composition, the percentage of the pigment is preferably 1.0% by mass or more, or more preferably 1.2% by mass or more, from the viewpoint of improving image printing density on printed matters, and it is preferably 5.0% by mass or less, or more preferably 4.0% by mass or less, from the viewpoint of improving discharge stability. It should be noted that, if the pigment is a white pigment, the percentage of the white pigment in the ink composition is preferably 3.0% by mass or more, or more preferably 5.0% by mass or more, and preferably 15.0% by mass or less, or more preferably 10.0% by mass or less.

If the aforementioned pigment is used in the UV-curable aqueous inkjet printing ink composition proposed by the present invention, preferably a pigment dispersant is used.

The pigment dispersant is used to improve dispersibility of the pigment and storage stability of the ink composition, and although any conventionally used pigment dispersant can be used without specific limitations, preferably a polymer pigment dispersant is used, for example. For the pigment dispersant, any one pigment dispersant can be used alone, or two or more types can be combined.

The polymer pigment dispersant may be, for example, a carbodiimide-based dispersant, polyester amine-based dispersant, fatty acid amine-based dispersant, modified polyacrylate-based dispersant, modified polyurethane-based dispersant, multi-chain polymer nonionic dispersant, polymer ion activator, etc.

Such polymer pigment dispersant is preferably soluble in water, such as BYKJET-9150, BYKJET-9151, BYKJET-9170, DISPERBYK-168, DISPERBYK-190, DISPERBYK-198, DISPERBYK-2010, DISPERBYK-2012, and DISPERBYK-2015 by BYK-Chemie GmbH, SMA 1440, SMA 2625, SMA 17352, SMA 3840, SMA 1000, SMA 2000, and SMA 3000 by Cray Valley SA, JONCRYL 67, JONCRYL 678, JONCRYL 586, JONCRYL 611, JONCRYL 680, JONCRYL 682, JONCRYL 690, JONCRYL 819, JONCRYL-JDX 5050, EFKA 4550, EFKA 4560, EFKA 4585, EFKA 5220, and EFKA 6230 by BASF Japan Ltd., and SOLSPERSE 20000, SOLSPERSE 27000, SOLSPERSE 41000, SOLSPERSE 41090, SOLSPERSE 43000, SOLSPERSE 44000, SOLSPERSE 46000, SOLSPERSE 47000, SOLSPERSE 54000 by The Lubrizol Corporation, and the like.

The content of the pigment dispersant is preferably 1.0 part by mass or more, or more preferably 5.0 parts by mass or more, and preferably 100 parts by mass or less, or more preferably 60.0 parts by mass or less, relative to 100 parts by mass of the pigment, from the viewpoint of increasing dispersibility of the pigment and storage stability of the ink composition.

(Water)

Water is blended in as a solvent for dissolving and dispersing a coloring agent, etc. Water includes purified water, ion-exchanged water, etc.

Preferably the content of water is 10% by mass or more in the ink composition. Also, preferably the content of water is 40% by mass or less in the ink composition. Keeping the content of water within the aforementioned range provides an advantage in that the ink composition will have good dispersion stability.

(Optional Components)

The ink composition proposed by the present invention may contain surface conditioners, water-soluble organic solvents, storability improving agents, UV absorbents, antioxidants, defoaming agents, antifungal agents, rustproofing agents, thickening agents, humectant, pH adjusting agents and various other additives as optional components as deemed appropriate.

Surface Conditioners

Surface conditioners that may be contained in the ink composition proposed by the present invention are not specifically limited. Silicone-based surface conditioners, fluorine-based surface conditioners, acetylene-based surface conditioners, etc., are preferred. The acetylene-based surface conditioners include DYNOL 607, DYNOL 609, EXP-4001, EXP-4300, and OLFINE E1010 (Nissin Chemical Industry Co., Ltd.), for example. The silicone-based surface conditioners include BYK-307, 333, 347, 348, 349, 345, 378, and 3455 (BYK-Chemie GmbH), for example. The fluorine-based surface conditioners include F-410, 444 and 553 (DIC Corporation), as well as FS-65, 34, 35, 31, and 30 (DuPont de Nemours, Inc.), for example.

If a surface conditioner is contained, the content of the surface conditioner is not specifically limited; however, preferably the content is such that the surface tension of the ink composition will become 25 to 40 mN/m, or more preferably the content is 0.1 to 1.5% by mass in the ink composition.

Water-Soluble Organic Solvents

The ink composition proposed by the present invention may contain a water-soluble organic solvent to adjust its storage stability and discharge stability, jetting property of the ink, and so on. The water-soluble organic solvent is not specifically limited, but preferably it is an alcohol, polyalcohol, lower alkyl ether of polyalcohol, ketone, ether, ester, nitrogen-containing compound, amide, etc. Also, the content of the water-soluble organic solvent is not specifically limited.

The alcohol may be methanol, ethanol, n-propanol, n-butanol, n-pentanol, n-hexanol, n-heptanol, n-octanol, n-nonyl alcohol, n-decanol, or isomer thereof, cyclopentanol, cyclohexanol, etc.

The polyalcohol may be glycerin, ethylene glycol, propylene glycol, 1,3-butylene glycol, 1,4-butylene glycol, 1,2-pentanediol, 4-methyl-1,2-pentanediol, 3,3-dimethyl-1,2-butanediol, 1,5-pentanediol, neopentyl glycol, 1,2-hexanediol, 2-ethyl-1,3-hexanediol, 2-methyl-1,3-butanediol, 5-methyl-1,2-hexanediol, 3-methyl-1,3-butanediol, 3-methyl-1,5-butanediol, 1,6-hexanediol, 1,2-cyclohexanediol, 2,2,4-trimethyl-1,3-pentanediol, 2,5-dimethyl-2,5-hexanediol, 1,2-octanediol, 1,8-octanediol, 1,9-nonanediol, 1,10-decanediol, pentaerythritol, diethylene glycol, dipropylene glycol, triethylene glycol, tetraethylene glycol, polyethylene glycol, polypropylene glycol, thiodiglycol, etc.

The lower alkyl ether of polyalcohol may be ethylene glycol monomethyl ether, ethylene glycol dimethyl ether, ethylene glycol monoethyl ether, ethylene glycol diethyl ether, ethylene glycol monopropyl ether, ethylene glycol isopropyl ether, ethylene glycol monobutyl ether, ethylene glycol isobutyl ether, propylene glycol monomethyl ether, propylene glycol monoethyl ether, propylene glycol monopropyl ether, propylene glycol monobutyl ether, diethylene glycol monomethyl ether, diethylene glycol monoethyl ether, diethylene glycol monobutyl ether, dipropylene glycol mono-n-propyl ether, dipropylene glycol mono-n-butyl ether, etc.

The ketone may be acetone, methyl ethyl ketone, methyl butyl ketone, methyl isobutyl ketone, diisopropyl ketone, cyclopentanone, cyclohexanone, etc.

The ether may be diethyl ether, isopropyl ether, n-butyl ether, tetrahydrofuran, tetrahydropyran, 1,4-dioxane, etc.

The ester may be ethyl acetate, propylene carbonate, methyl acetate, ethyl acetate, propyl acetate, isopropyl acetate, butyl acetate, isobutyl acetate, amyl acetate, ester lactate, ester butyrate, dibutyl phthalate, dioctyl phthalate, or ε-caprolactone, ε-caprolactam, or other cyclic ester, etc.

The nitrogen-containing compound may be 2-pyrrolidone, N-methylpyrrolidone, N-ethylpyrrolidone, N-methyl-oxazolidinone, N-ethyloxazolidinone, etc.

The amide may be β-alkoxypropionamide, etc.

Storability Improving Agent

As a storability improving agent, a hindered amine of N—CH$_3$ type, N—H type, N—OR type, etc., can be used.

UV Absorbents

UV absorbents include benzophenone-based UV absorbents, benzotriazole-based UV absorbents, salicylate-based UV absorbents, hydroxyphenyl triazine-based UV absorbents, cyanoacrylate-based UV absorbents, nickel complex salt-based UV absorbents, etc.

Antioxidants

Antioxidants include phenol-based antioxidants, amine-based antioxidants, sulfur-based antioxidants, phosphorus-based antioxidants, etc.

Defoaming Agents

Defoaming agents include silicone-based defoaming agents, Pluronic-based defoaming agents, etc.

The UV-curable aqueous inkjet printing ink composition proposed by the present invention has a viscosity at 25° C. of preferably 100 mPa·s or lower, or more preferably 30 mPa·s or lower. The ink composition is blended with a viscosity-adjusting agent, etc., as necessary. It should be noted that the viscosity stated in the Specification pursuant to the present application for patent represents a value measured at 25° C. using a type-E viscometer (Viscometer Model RE100L, Toki Sangyo Co., Ltd.).

<Method for Preparing Ink Composition>

The method for preparing the UV-curable aqueous inkjet printing ink composition proposed by the present invention is not specifically limited. As an example, the ink composition can be prepared by mixing the materials contained therein using a bead mill, triple-roll mill, etc. It should be noted that, with regard to the pigment, the pigment may be mixed with the aforementioned pigment dispersants and photopolymerizable monomers to obtain a base ink composition beforehand, with the remainder of the aforementioned components added thereto to a desired composition, to prepare the ink composition.

<Method for Printing>

The method for printing using the UV-curable aqueous inkjet printing ink composition proposed by the present invention is explained.

The inkjet printing device used is not specifically limited so long as it is a device capable of printing UV-curable ink compositions.

Also, the base materials to be printed on are not specifically limited, either, and various resin base materials, paper, capsule, gel, metal foil, glass, wood, fabric, etc., can be adopted as base materials.

The area printed with the UV-curable aqueous inkjet printing ink composition proposed by the present invention, obtained by discharging the ink composition onto the base material surface, is irradiated with ultraviolet ray for partial curing (pinning). Next, ultraviolet ray is irradiated for full curing, to cure the ink composition in the printed area.

Here, "partial curing (pinning)" means curing the ink composition, which has been discharged onto the base material surface, to the extent that the ink composition loses fluidity, and the pinned ink composition contains the uncured components and solvent.

During this partial curing (pinning), the surface of the printed area is irradiated with a UV-LED light having a peak wavelength between 365 and 405 nm, to a cumulative light quantity of 100 mJ/cm$^2$ or less.

The full curing step that follows the partial curing is a step to irradiate ultraviolet ray to a cumulative light quantity sufficient to cure the ink composition completely, and preferably ultraviolet ray is irradiated so that a cumulative light quantity of 100 to 300 mJ/cm$^2$ is achieved in the full curing step alone.

EXAMPLES

Ink compositions 1 to 14 specified in Table 1 below were prepared and pinned under the conditions in Table 2.

EO-modified TMPTA: Trimethylolpropane EO-modified triacrylate

CN131B: Epoxy (meth)acrylate oligomer (product name "Sartomer CN131B", Sartomer Company, Inc.)

CN371: Amine-modified (meth)acrylate oligomer (product name "Sartomer CN371", Sartomer Company, Inc.)

TPO-L: (2,4,6-trimethylbenzoyl)-ethoxyphenylphosphine oxide

BYK-333: Silicone-based surface conditioner (BYK-Chemie GmbH)

P. B. 15:4: Pigment Blue 15:4

P. R. 122: Pigment Red 122

P. Y. 138: Pigment Yellow 138

P. Bk. 7: Carbon black

BYKJET-9151: Water-soluble polymer dispersant (BYK-Chemie GmbH) Methods for Evaluation (Compatibility)

Each ink was put in a brown bottle and kept stationary for 24 hours at room temperature, and then visually inspected for presence or absence of separation.

◯: No separation x: Separated into two layers.

Subsequent evaluations were performed on the inks other than those that were given "x" in the compatibility evaluation.

(Storage Stability)

Each ink was sampled into a brown bottle and then sealed and stored for 2 weeks at 60° C., after which the ink was measured for viscosity using a type-E viscometer (Viscometer Model RE100L, Toki Sangyo Co., Ltd.) under the conditions of 25° C. in temperature and 20 rpm in rotor revolution speed, to calculate the rate of increase in viscosity according to Formula (1), thereby evaluating storage stability thereof according to the evaluation criteria below.

$$((\text{Viscosity after 2 weeks at } 60°\text{ C.}-\text{Viscosity before storage})/\text{Viscosity before storage})\times 100 \qquad \text{Formula (1)}$$

◯: The rate of increase in viscosity is under 10%.

x: The rate of increase in viscosity is 10% or higher.

(Grainy Feel)

Each ink was printed on OK Top Coat paper (Oji Paper Co., Ltd.) using an inkjet evaluation machine, pinned by UV-LED irradiation to the cumulative light quantity for pinning shown in Table 2, and then cured by irradiating 200 mJ/cm$^2$ of ultraviolet ray in cumulative light quantity. The obtained cured coating film was visually observed to evaluate the grainy feel according to the evaluation criteria below.

◯: There is no grainy feel.

Δ: There is a slight grainy feel.

x: There is a significant grainy feel.

(Curability)

Each ink was printed on OK Top Coat paper (Oji Paper Co., Ltd.) using an inkjet evaluation machine, pinned by UV-LED irradiation to the cumulative light quantity for pinning shown in Table 2, and then cured by irradiating 200 mJ/cm$^2$ of ultraviolet ray in cumulative light quantity. The obtained cured coating film was rubbed with a cotton swab to evaluate curability according to the evaluation criteria below.

◯: No marks were left where rubbed with the cotton swab.

Δ: Slight rubbing marks were left.

x: The coating film was removed by the cotton swab.

(Water Resistance)

Each ink was printed on OK Top Coat paper (Oji Paper Co., Ltd.) using an inkjet evaluation machine, pinned by UV-LED irradiation to the cumulative light quantity for pinning shown in Table 2, and then cured by irradiating 200 mJ/cm$^2$ of ultraviolet ray in cumulative light quantity. The obtained cured coating film was rubbed with a cotton swab moistened with water to evaluate water resistance according to the evaluation criteria below.

◯: Not removed by 40 back-and-forth rubs.

Δ: Removed by 11 to 39 back-and-forth rubs.

x: Removed by no more than 10 back-and-forth rubs.

TABLE 1

| Ink compositions | | 1 | 2 | 3 | 4 | 5 | 6 | 7 |
|---|---|---|---|---|---|---|---|---|
| Water-soluble acrylamide-based monomers | Acryloyl morpholine | 25.00 | 40.00 | 10.00 | 24.30 | 24.70 | 24.50 | 28.25 |
| | Diacetone acrylamide | 5.00 | 5.00 | 5.00 | 5.00 | 5.00 | 5.00 | 5.00 |
| Water-soluble hydroxyl group-containing monofunctional monomer | 4-hydroxybutyl acrylate | 25.00 | 10.00 | 40.00 | 24.30 | 24.70 | 24.50 | 28.25 |
| Water-insoluble | EO-modified TMPTA | 5.00 | 5.00 | 5.00 | 5.00 | 5.00 | 5.00 | 2.00 |
| polymerizable | CN131B | 6.00 | 6.00 | 6.00 | 6.00 | 6.00 | 6.00 | 3.00 |
| compounds | CN371 | 2.50 | 2.50 | 2.50 | 2.50 | 2.50 | 2.50 | 1.00 |
| Purified water | | 23.80 | 23.80 | 23.80 | 23.80 | 23.80 | 23.80 | 23.80 |
| Photopolymerization initiator | TPO-L | 5.00 | 5.00 | 5.00 | 5.00 | 5.00 | 6.00 | 6.00 |

TABLE 1-continued

| | | | | | | | | |
|---|---|---|---|---|---|---|---|---|
| Surface conditioner | BYK-333 | 0.20 | 0.20 | 0.20 | 0.20 | 0.20 | 0.20 | 0.20 |
| Pigments | P. B. 15:4 | 2.00 | 2.00 | 2.00 | | | | 2.00 |
| | P. R. 122 | | | | 3.00 | | | |
| | P. Y. 138 | | | | | 2.50 | | |
| | P. Bk. 7 | | | | | | 2.00 | |
| Pigment dispersant | BYKJET-9151 | 0.50 | 0.50 | 0.50 | 0.90 | 0.60 | 0.50 | 0.50 |
| Total | | 100.00 | 100.00 | 100.00 | 100.00 | 100.00 | 100.00 | 100.00 |
| Evaluations | Compatibility | ○ | ○ | ○ | ○ | ○ | ○ | ○ |
| | Storage stability | ○ | ○ | ○ | ○ | ○ | ○ | ○ |

| Ink compositions | | 8 | 9 | 10 | 11 | 12 | 13 | 14 |
|---|---|---|---|---|---|---|---|---|
| Water-soluble acrylamide-based monomers | Acryloyl morpholine | 20.25 | 36.90 | 45.00 | 5.00 | 21.50 | 30.00 | 19.00 |
| | Diacetone acrylamide | 5.00 | 5.00 | 5.00 | 5.00 | 5.00 | 5.00 | 5.00 |
| Water-soluble hydroxyl group-containing monofunctional monomer | 4-hydroxybutyl acrylate | 20.25 | 36.90 | 5.00 | 45.00 | 21.50 | 30.00 | 19.00 |
| Water-insoluble | EO-modified TMPTA | 8.00 | 5.00 | 5.00 | 5.00 | 5.00 | 1.00 | 10.00 |
| polymerizable | CN131B | 9.00 | 6.00 | 6.00 | 6.00 | 6.00 | 2.00 | 11.00 |
| compounds | CN371 | 5.00 | 2.50 | 2.50 | 2.50 | 2.50 | 1.00 | 5.00 |
| | Purified water | 23.80 | | 23.80 | 23.80 | 23.80 | 23.30 | 23.30 |
| Photopolymerization initiator | TPO-L | 6.00 | 5.00 | 5.00 | 5.00 | 12.00 | 5.00 | 5.00 |
| Surface conditioner | BYK-333 | 0.20 | 0.20 | 0.20 | 0.20 | 0.20 | 0.20 | 0.20 |
| Pigments | P. B. 15:4 | 2.00 | 2.00 | 2.00 | 2.00 | 2.00 | 2.00 | 2.00 |
| | P. R. 122 | | | | | | | |
| | P. Y. 138 | | | | | | | |
| | P. Bk. 7 | | | | | | | |
| Pigment dispersant | BYKJET-9151 | 0.50 | 0.50 | 0.50 | 0.50 | 0.50 | 0.50 | 0.50 |
| Total | | 100.00 | 100.00 | 100.00 | 100.00 | 100.00 | 100.00 | 100.00 |
| Evaluations | Compatibility | ○ | ○ | x | x | x | ○ | x |
| | Storage stability | ○ | ○ | — | — | — | ○ | — |

TABLE 2

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Ink used | | 1 | 2 | 3 | 4 | 5 | 6 | 7 | 8 | 1 | 1 |
| Pinning | | Yes | Yes | Yes | Yes | Yes | Yes | Yes | Yes | Yes | Yes |
| Cumulative light quantity for pinning (mJ/cm²) | | 20 | 20 | 20 | 20 | 20 | 20 | 20 | 20 | 50 | 80 |
| Evaluations | Grainy feel | ○ | ○ | ○ | ○ | ○ | ○ | ○ | ○ | ○ | Δ |
| | Curability | ○ | ○ | ○ | ○ | ○ | ○ | ○ | ○ | ○ | ○ |
| | Water resistance | ○ | ○ | ○ | ○ | ○ | ○ | Δ | ○ | ○ | ○ |

| | | Comparative Examples | | | | | | | |
|---|---|---|---|---|---|---|---|---|---|
| | | 1 | 2 | 3 | 4 | 5 | 6 | 7 | 8 |
| Ink used | | 1 | 1 | 9 | 10 | 11 | 12 | 13 | 14 |
| Pinning | | No | Yes | Yes | Yes | Yes | Yes | Yes | Yes |
| Cumulative light quantity for pinning (mJ/cm²) | | — | 120 | 20 | 20 | 20 | 20 | 20 | 20 |
| Evaluations | Grainy feel | x | x | x | — | — | — | ○ | — |
| | Curability | ○ | ○ | ○ | — | — | — | ○ | — |
| | Water resistance | ○ | ○ | ○ | — | — | — | x | — |

60

As shown in Table 1, ink compositions 1 to 8 representing examples of UV-curable aqueous inkjet printing ink compositions conforming to the present invention, demonstrated excellent compatibility and storage stability.

However, ink compositions 10 to 12 and 14 not covered by the present invention in terms of the components, other than water, in the UV-curable aqueous inkjet printing ink compositions, had such poor compatibility that evaluation of storage stability was not performed.

Additionally, in Table 2, Examples 1 to 10 using ink compositions 1 to 8 were free of grainy feel in the cured printed area, while demonstrating excellent curability and water resistance.

By contrast, Comparative Example 1 without pinning, Comparative Example 2 associated with an excessive cumulative light quantity of ultraviolet ray during pinning, and Comparative Example 3 using ink composition 9 not containing water, all proved inferior in terms of grainy feel. Comparative Example 7 using ink composition 13 containing less water-insoluble polymerizable compounds, had poor water resistance.

What is claimed:

1. A UV-curable aqueous inkjet printing ink composition, which comprises, relative to a total mass of all polymerizable components, each of:

water-soluble acrylamide-based monomers by 20.0 to 70.0% by mass, water-soluble hydroxyl group-containing monofunctional monomers by 5.0 to 60.0% by mass, and water-insoluble polymerizable compound(s) by 8.0 to 35.0% by mass, which includes polymerizable oligomers by 5.0 to 25.0% by mass;

which further comprises, relative to 100 parts by mass representing a total mass of all polymerizable components, a photopolymerizable initiator and/or sensitizer by 3.0 to 10.0 parts by mass;

which further contains:

a pigment;

a pigment dispersant having a maleimide structure, or a pigment dispersant having a maleimide structure and a pigment dispersant having a pyridine ring; and water;

wherein a ratio of the water-soluble acrylamide-based monomers and the water-soluble hydroxyl group-containing monofunctional monomers, (water-soluble acrylamide-based monomers/water-soluble hydroxyl group-containing monofunctional monomers), is from 0.3 to 10.0; and the ink composition has ability to be partially cured by being irradiated with a UV-LED light having a peak wavelength between 365 and 405 nm, at a cumulative light quantity of 100 mJ/cm$^2$ or less, wherein the partially cured ink composition is non-flowable while maintaining uncured components and water.

2. The UV-curable aqueous inkjet printing ink composition according to claim 1, wherein the water-soluble acrylamide-based monomers include acryloyl morpholine.

3. The UV-curable aqueous inkjet printing ink composition according to claim 1, wherein the water-soluble hydroxyl group-containing monofunctional monomers include 4-hydroxybutyl acrylate.

4. The UV-curable aqueous inkjet printing ink composition according to claim 1, wherein a content of the water is 10.0 to 40.0% by mass relative to the ink composition as a whole.

5. A method for printing using a UV-curable aqueous inkjet printing ink composition, which comprises, relative to a total mass of all polymerizable components, each of:

water-soluble acrylamide-based monomers by 20.0 to 70.0% by mass, water-soluble hydroxyl group-containing monofunctional monomers by 5.0 to 60.0% by mass, and water-insoluble polymerizable compound(s) by 8.0 to 35.0% by mass, which includes polymerizable oligomers by 5.0 to 25.0% by mass;

which further comprises, relative to 100 parts by mass representing a total mass of all polymerizable components, a photopolymerizable initiator and/or sensitizer by 3.0 to 10.0 parts by mass;

which further contains:

a pigment;

a pigment dispersant having a maleimide structure, or a pigment dispersant having a maleimide structure and a pigment dispersant having a pyridine ring; and water;

wherein a ratio of the water-soluble acrylamide-based monomers and the water-soluble hydroxyl group-containing monofunctional monomers, (water-soluble acrylamide-based monomers/water-soluble hydroxyl group-containing monofunctional monomers), is from 0.3 to 10.0;

said method comprising:

a step to discharge the ink composition on a substrate by inkjet printing;

a step to partially curing the ink composition by irradiating it using a UV-LED lamp having a peak wavelength between 365 and 405 nm, at a cumulative light quantity of 100 mJ/cm$^2$ or less, wherein the partially cured ink composition is non-flowable while maintaining uncured components and water; and a step to subsequently fully cure it with ultraviolet ray.

6. The method for printing using a UV-curable aqueous inkjet printing ink composition according to claim 5, wherein the ink composition contains acryloyl morpholine as the water-soluble acrylamide-based monomers.

7. The method for printing using a UV-curable aqueous inkjet printing ink composition according to claim 5, wherein the water-soluble hydroxyl group-containing monofunctional monomers include 4-hydroxybutyl acrylate.

8. The method for printing using a UV-curable aqueous inkjet printing ink composition according to claim 5, wherein a content of the water is 10.0 to 40.0% by mass relative to the ink composition as a whole.

9. The UV-curable aqueous inkjet printing ink composition according to claim 1, wherein the polymerizable oligomers include one or more oligomers selected from amine-modified (meth)acrylate oligomers and epoxy (meth) acrylate oligomers.

10. The method for printing using a UV-curable aqueous inkjet printing ink composition according to claim 5, wherein the polymerizable oligomers in the ink composition include one or more oligomers selected from amine-modified (meth)acrylate oligomers and epoxy (meth)acrylate oligomers.

* * * * *